Dec. 23, 1969  R. M. CHASE  3,485,125
APPARATUS FOR CUTTING A BLOCK OF FROZEN FOODSTUFF
Filed Nov. 6, 1967  4 Sheets-Sheet 1

Dec. 23, 1969  R. M. CHASE  3,485,125
APPARATUS FOR CUTTING A BLOCK OF FROZEN FOODSTUFF
Filed Nov. 6, 1967  4 Sheets-Sheet 4

United States Patent Office 3,485,125
Patented Dec. 23, 1969

3,485,125
APPARATUS FOR CUTTING A BLOCK OF FROZEN FOODSTUFF
Robert M. Chase, Berea, Ohio, assignor to The Gorton Corporation, Gloucester, Mass., a corporation of Delaware
Filed Nov. 6, 1967, Ser. No. 680,881
Int. Cl. B26d 4/42; B23d 51/02
U.S. Cl. 83—201                                   13 Claims

ABSTRACT OF THE DISCLOSURE

The present invention relates to apparatus for cutting frozen materials and more particularly to an improved apparatus for cutting relatively large rectangular blocks of frozen foodstuff, e.g., frozen fish flesh.

In the commercial production of frozen fish in the form of individual portions ready for final cooking, it is common practice to first freeze the fish in the form of a relatively large, generally rectangular block for ease of handling in bulk. In the further processing operations the fish blocks are cut into slabs and the slabs then further cut into pieces the size of an individual portion. The invention is concerned particularly with improvements in apparatus for cutting such blocks into slabs by a sawing operation.

It is an object of the invention to provide an improved apparatus into which frozen fish blocks may be loaded and which thereupon will convey the blocks through the apparatus and cut them into slabs of a preselected size which are delivered from the apparatus at a delivery station.

In accordance with the invention the apparatus comprises a saw, preferably a band saw, located at a cutting station in the apparatus, together with a plurality of individual supports for receiving and carrying individual blocks through the apparatus in a closed path past the saw to be severed into slabs thereby, together with mechanism adjacent the saw for engaging a block on a support as it moves into position adjacent the saw and urging the block transversely of the line of travel of the support and toward the saw. Preferably such block engaging mechanism comprises a plurality of pusher arms movable transversely of said line of travel, the pusher arms being operated by fluid pressure mechanism, such as an hydraulic or air-operated cylinder and piston. A guide, or fence, preferably is provided at the opposite side of the saw from the support to guide the block as it is cut and as it is urged against the fence by the pusher arms. The fluid pressure mechanism desirably is controlled by a valve operated by movement of the support as it moves past the saw to operate the pusher arms in timed relation with the movement of the support. Preferably the support includes a spring-pressed member for holding a block in position on the support, but capable of yielding to permit the block to move under the influence of the pusher arms.

Other objects, features, and advantages of the invention will become apparent from the following description of an illustrative embodiment thereof in which description reference is made to the accompanying drawings, wherein FIG. 1 is a plan view partly broken away and in section for clarity of illustration;

Figure 1:
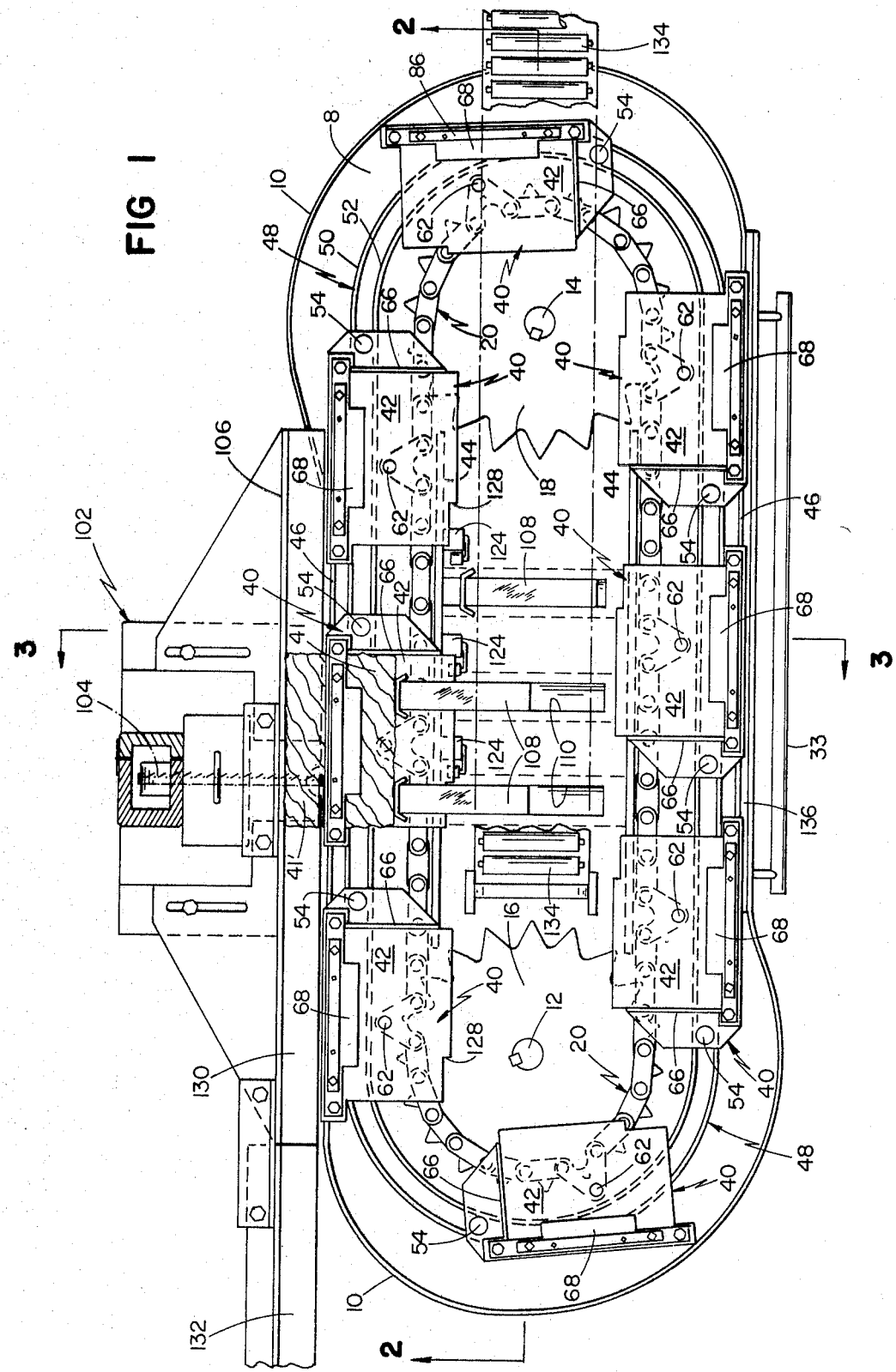

Referring to the illustrative embodiment shown in the drawing, the apparatus of the invention is supported on any suitable frame work comprising in this instance vertical members or legs 2 interconnected by horizontal members 4 and 6, the latter supporting a horizontal bedplate 8. Around the periphery of the greater part of the bedplate 8, as shown, is an upstanding rim 10.

Figure 2:
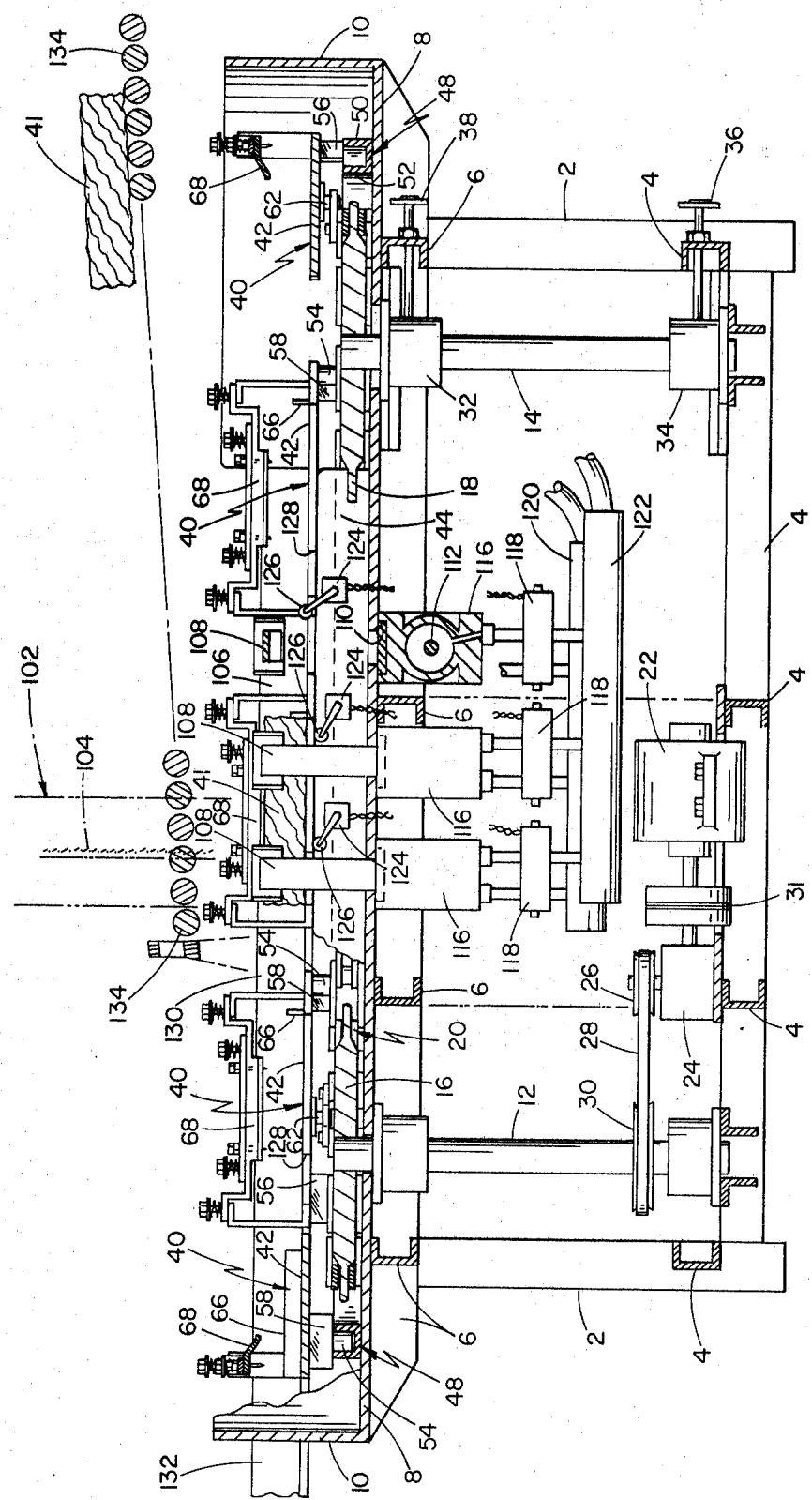
FIG. 2 is a vertical sectional view taken on line 2—2 of FIG. 1.

Spaced vertical shafts 12 and 14 are suitably supported for rotation on the framework with their upper ends extending through and above the bedplate 8. Shaft 12 carries on its upper end above the bedplate 8 a sprocket 16 and the shaft 14 carries on its upper end a similar sprocket 18. Trained about the sprockets 16, 18 is a drive chain 20 for carrying the supports which support a frozen block in a closed path past the cutting saw. For this purpose the shaft 12 is driven by an electric motor 22, FIG. 2, through a speed reducer 24 whose output pulley 26 is connected by belt 28 to a belt pulley 30 on shaft 12. The speed reducer 24 may include a variable ratio drive unit or the pulley 26 may be a variable speed sheave, so that the speed of the shaft 12 may be adjusted as desired. The shaft 14 is an idler shaft. Its bearings may be carried on pillow blocks 32, 34 slidable adjustable on the framework by means of the adjusting screws 36, 38 to adjust the tension in the chain 20 as desired and to take-up for wear. The drive connection between the motor 22 and the shaft 12 is provided with an overload slip mechanism to prevent breakage of machine parts in the event of a jam or freeze-up. This may take any desired form, for example a slip connection between pulley 30 and the shaft 12 or, as shown, an overload slip clutch 31 in the drive between the motor 22 and the speed reducer 24.

Further protection of the machine and operator is provided by a push bar 33 which, when pushed, opens a switch 35 in the motor supply line and which is located in convenient position to be pushed, leaned against, or kicked by the operator.

Figure 3:
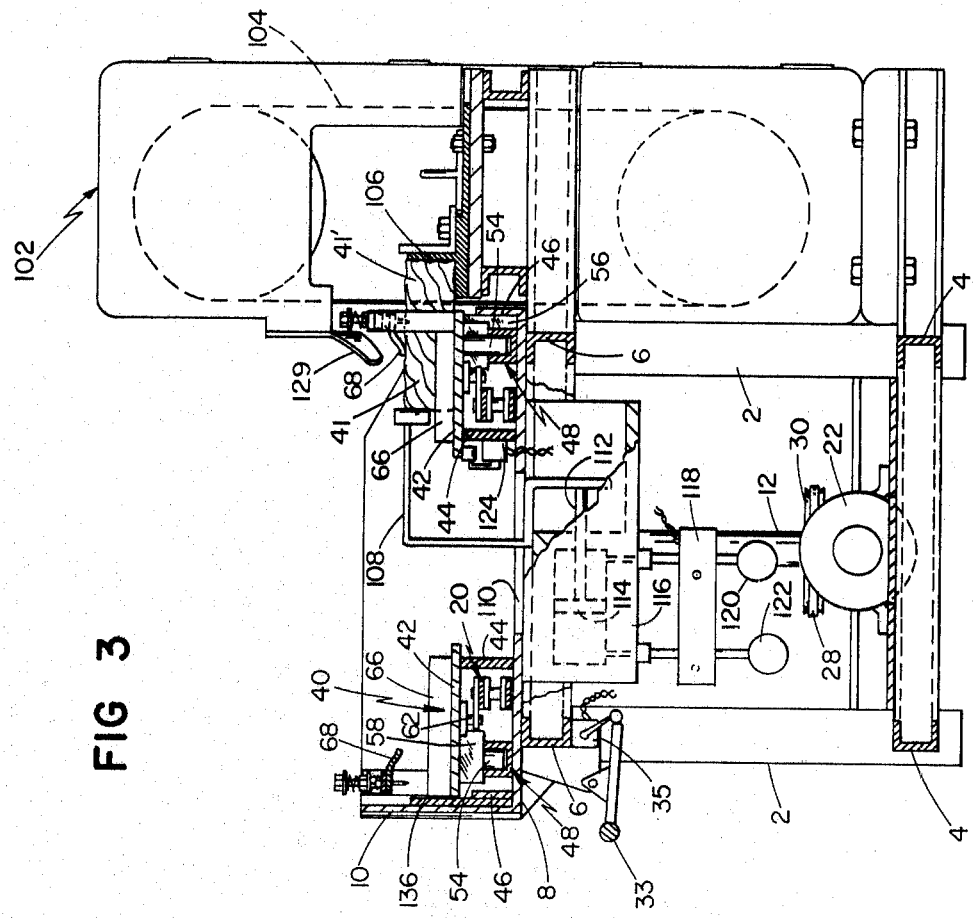
FIG. 3 is a vertical sectional view taken on line 3—3 of FIG. 1.
Figure 4:
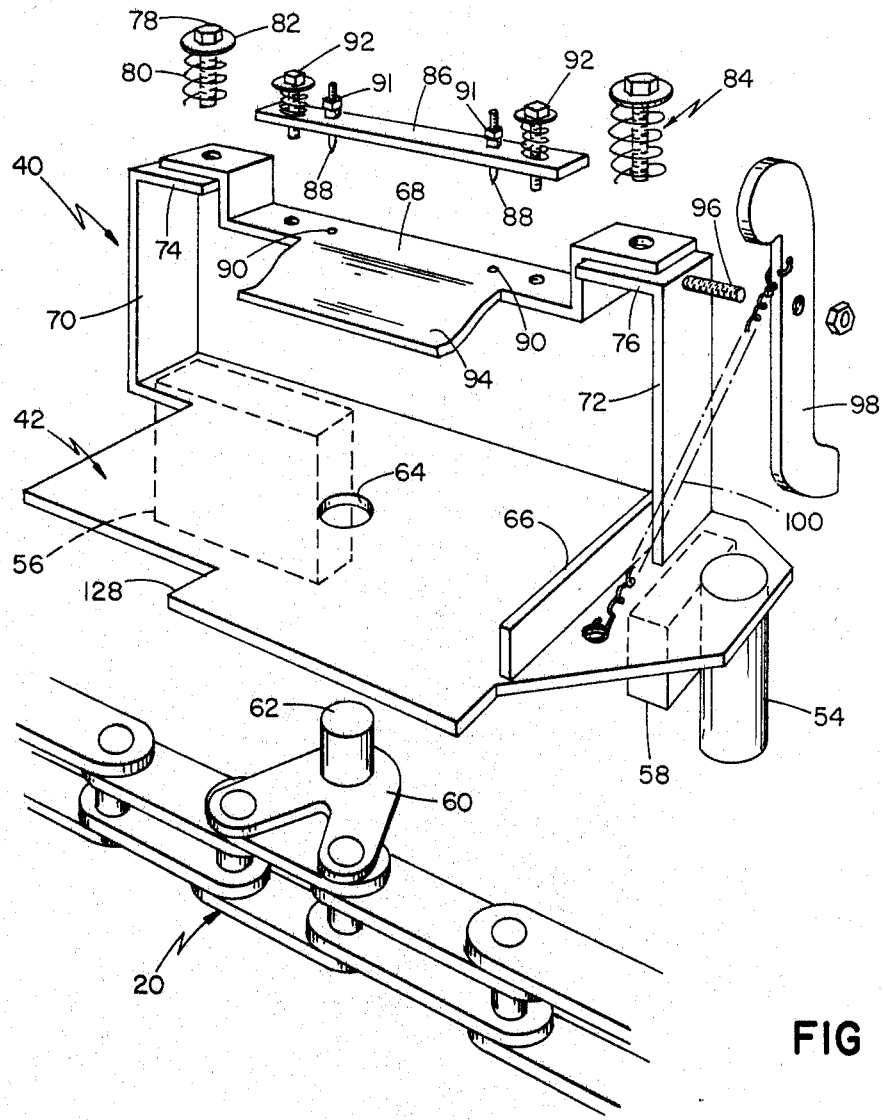
FIG. 4 is a detail exploded view of one of the block carriers showing its construction and its relationship to the drive chain.

Disposed above the chain 20 is a plurality of individual supports 40 for the frozen blocks of foodstuffs 41 which are to be cut. Each support 40, referring particular to FIG. 4, comprises a platform 42 adapted to receive and support the frozen block 41 and in turn to be supported and guided by a series of tracks 44, 46 and 48. The tracks 44, as appears in FIGS. 1, 2 and 3 extend along the straight stretches of the flights of the chain 20 and are of a height and are so disposed as to engage the under surface of the platforms 42 in the vicinity of their inner edges. The guide track 48 is U-shaped in cross-section with upstanding arms 50, 52 spaced apart so as to loosely receive between them the pin or roller 54 which depends from the platform 42 near its trailing end. The tracks 46, like the tracks 44 extend, as appears in FIG. 1, along the straight-away flights of the chain 20. They are spaced from the track 48 at a distance such that a block 56, extending downwardly from the under surface of the platform 42, is loosely received between them to substantially prevent pivoting of the platform 42 about the pin 54 so that it travels in a straight line direction past the saw blade to guide and align the block 41 for cutting. Another block 58 depends from the under surface of the platform 42 and rides on the top of the track 48 to support the trailing end of the platform in the vertical direction. The tracks 44, 46 and 48 are mounted on the bedplate 8 and the bottom surface of the block 56 slides on the bedplate 8. The chain 20 runs between the tracks 44 and 48 and its flights also rest on the bedplate 8. The platform 42 of each support 40 is connected to the chain 20 to be carried along thereby by means of a lug 60 on the chain carrying an upstanding pin 62 which is loosely received in a circular hole 64 in the platform 42. The platform 42 may pivot as needed about the pin 62 to permit the pin 54 to ride in the track 48. The track 48 is provided with straight portions for the guidance of the supports 40 as they pass through that portion of their travel in which the block is subject to being engaged by the cutting saw. Thus through cooperating of the tracks 46, 48 and the block 56 and pin 54 the plate 42 is maintained against rocking or tilting motion in the horizontal plane throughout the time when the frozen block is being cut.

Each platform 42 is provided with an upstanding flange 66 adjacent its trailing edge to engage the frozen block 41 resting on the platform and assure its forward movement with its support 40.

Each support 40 includes a spring-pressed member for yieldingly holding a block 41 in position on the support. In the illustrative embodiment this comprises a bar 68 supported at each end on standards 70, 72 upstanding from the platform 42 and having inturned ears 74, 76 underlying the ends of the bar 68. The ear 74 is provided with a threaded stud 78 having a hexagonal head fixed on its upper end and having its lower end threaded into the ear 74. The stud 78 passes loosely through a hole in the bar 68. A coil compression spring 80 extending between the end of the bar 68 and a washer 82 on the stud beneath its head tends to urge the bar downwardly and into engagement with the block 41 which is on the platform 42. The other end of the bar 68 is provided with similar yielding spring means 84.

Carried on the bar 68 is a spike bar 86 provided with a series of spikes 88 extending through holes 90 in the bar 68 and adapted to engage a block 41 on the platform 42 to hold it against twisting or misalignment. The distance which the spikes 88 extend below the bar 86 is adjustable by means of a nut and lock nut 91 threaded on each spike 88. The spike bar 86 is mounted on and yieldingly urged toward the bar 68 by means of a compression spring and stud arrangement 92 at each of its ends which is similar to the stud, washer and spring arrangement 78, 80 and 82 described above.

The bar 68 is provided with a lip 94 extending from one of its edges as shown, for engaging the frozen block 41 as will be described hereinafter.

Pivoted at 96 on the standard 72 as shown is a pusher finger 98 having its lower end urged outwardly of the support 40 by a tension spring 100 into a position to engage the trailing end of a slab 41'.

Positioned adjacent one of the straight runs of the drive chain 20 is a band saw unit 102. This may be a standard band saw unit known in the art having a band saw blade 104. The saw unit is located so that the cutting portion of the saw is adjacent the outer edge of the platform 42 as the platform moves past the saw. The saw table is at the same elevation as the platform 42 and is provided with an adjustable fence 106 extending parallel to the direction of travel of the support 40 and disposed so as to intercept and guide a frozen block 41 on the adjacent platform 42 when the block is pushed outwardly of the platform by means next to be described.

The invention provides mechanism adjacent the saw blade 104 for engaging a block 41 on one of said supports 40 and urging the block transversely of the line of travel of the support and toward the saw blade 104. In its preferred form, as in the illustrative embodiment shown, this takes the form of a plurality of pusher arms 108 movable in guideways 110 transversely of the machine toward and from the block 41 which is adjacent the saw. Each pusher arm 108 is connected to a piston rod 112 of a piston 114 in a cylinder 116. For each cylinder 116 there is provided a conventional control valve 118 adapted to selectively connect its head end or its rod end to an air pressure manifold 120 or to an exhaust manifold 122, the head end being connected to exhaust when the rod end is connected to pressure and vice versa. Air is supplied from any suitable source to the pressure manifold 120 to maintain the desired pressure therein. Each pressure fluid control valve 118 is operated by a micro switch 124, each micro switch 124 being mounted on track 44 and positioned as shown so that its operating roller 126 is engaged by an edge 128 on the platform 42 as the platform approaches the micro switch. Engagement of the switch operating roller 126 by the platform edge 128 depresses the roller to operate the switch into condition to cause admission of pressure air to the head space of the corresponding cylinder 116, causing the corresponding pusher arm 108 to advance and engage the block 41. Advancement of the arm 108 after it has engaged the block 41 causes the block 41 to slide on the platform 42 outwardly and transversely of its path of travel until the block (or the remaining portion of a predecessor block) engages the saw fence 106. As the block 41 so slides, the lip 94 rides on the upper surface of the block, being urged downwardly by the spring 80, and maintains the bar 68 at a standard height above the upper surface of the block. The spike bar 86 moves upwardly or downwardly as necessary. The pusher arms 108 thus maintain the block in constant engagement with the saw fence 106 as the carrier 40 carries the block past the saw blade 104 to saw a slab 41' of predetermined width from the block. As appears from FIG. 2, the pusher arms 108 are operated in sequence as the carriers 40 in turn approach and pass by the saw blade 104. Referring to FIG. 1, the block 41 which is being sawed is engaged by two of the pusher arm 108 to hold it against the fence 106. The other pusher arm 108 in FIG. 1 is retracted, inasmuch as the carrier 40 which carries the block which is being sawed has passed by it and the succeeding carrier 40 has not yet reached it. The pusher arm which engages the part of the block which has passed the saw blade tends to close the saw kerf to help in advancing the stab.

As the pusher finger 98 approaches the saw, its upper end is engaged by a curved cam bar 129 to cause the pusher finger 98 to swing about its pivot 96 so that its lower end moves inwardly to clear the saw 104 as it moves past it.

The slabs 41' as they leave the saw slide along a track 130 carried on the saw table and are pushed along by succeeding blocks and/or by the pusher fingers 98, to be discharged from the apparatus down a discharge track 132.

When a slab 41' has been cut from a block 41, the remainder of the block remains on the support 40 and is carried along with it and in due course again passed through the saw, the pusher arms this time advancing it on the platform 42 transversely of the path of travel so that its outer surface again engages the fence 106 to cause a standard sized slab to be sawed from it. If such remainder is of the width of a standard stab only, the pusher fingers 98 are particularly useful in advancing it.

The blocks to be operated on are fed into the machine on a ramp 134 and an operator standing beside the machine adjacent the push bar 33 takes a block 41 from the ramp 134 and places it on the platform 42 of the adjacent support 40, pushing it in under the lip 94 of the hold-down bar 68 if appropriate. A spacer piece 136 on the inner surface of the rim 10 at the loading station predetermines the minimum spacing between a freshly loaded block and the rim 10. When a freshly loaded block is engaged and moved by the pusher arms 108 it pushes ahead of it any remainder of a predecessor block which remains on the support 40.

The apparatus may be provided with a plurality of saws if desired.

While a particular embodiment of the invention has been described in detail for purposes of disclosure of the invention, it is not intended to limit the invention to this particular embodiment as the apparatus is susceptible of changes in form, details of construction and arrangement of parts without departure from the invention. Accordingly reference should be had to the appended claims for a definition of the limits of the invention.

I claim:
1. Apparatus for cutting frozen blocks of foodstuff into slabs comprising a saw, a plurality of individual supports for individual blocks, mechanism adapted and arranged for continuously moving said supports in a closed path past said saw, and fluid-pressure operated mechanism adjacent said saw for engaging a block on one of said supports and operated by movement of said one of said supports to urge the block transversely of the line of travel of the support and toward said saw.

2. The apparatus of claim 1 wherein said mechanism for engaging a block comprises a plurality of pusher arms movable transversely of said line of travel.

3. The apparatus of claim 1 in combination with a stationary fence adjacent said saw, and extending generally parallel to said line of travel, adapted and arranged to engage a block urged thereagainst by said block engaging mechanism and guide said block past said saw.

4. The apparatus of claim 3 wherein said block engaging mechanism comprises a plurality of pusher arms movable transversely of said line of travel.

5. The apparatus of claim 4 wherein said block engaging mechanism is operated by fluid pressure mechanism.

6. The apparatus of claim 5 wherein said fluid pressure mechanism is controlled by a valve operated by movement of said one of said supports.

7. The apparatus of claim 3 wherein said block engaging mechanism is operated by fluid pressure mechanism.

8. The apparatus of claim 7 wherein said fluid pressure mechanism is controlled by a valve operated by movement of said one of said supports.

9. The apparatus of claim 8 wherein said supports include a spring pressed member for yieldingly holding a block in position on said support.

10. The apparatus of claim 3 wherein said supports include a spring pressed member for yieldingly holding a block in position on said support.

11. Apparatus for cutting frozen blocks of foodstuff into slabs comprising a saw, a plurality of individual supports for individual blocks, mechanism adapted and arranged for moving said supports in a closed path past said saw, and mechanism adjacent said saw operated by fluid pressure mechanism for engaging a block on one of said supports and urging the block transversely of the line of travel of the support and toward said saw, a stationary fence adjacent said saw, and extending generally parallel to said line of travel, adapted and arranged to engage a block urged thereagainst by said block engaging mechanism and guide said block past said saw, said fluid pressure mechanism being controlled by a valve operated by movement of said one of said supports.

12. The apparatus of claim 11 wherein said block engaging mechanism comprises a plurality of pusher arms movable transversely of said line of travel.

13. The apparatus of claim 11 wherein said supports include a spring pressed member for yieldingly holding a block in position on said support.

References Cited

UNITED STATES PATENTS

| | | | |
|---|---|---|---|
| 1,565,648 | 12/1925 | Hoyt | 146—81 X |
| 2,289,015 | 7/1942 | Jackson | 146—81 X |
| 2,936,013 | 5/1960 | Kirshner | 146—81 |
| 3,029,850 | 4/1962 | Reid | 146—84 X |
| 3,073,366 | 1/1963 | Sawyer et al. | 146—81 X |
| 3,151,644 | 10/1964 | Bainbridge et al. | 146—81 X |

JAMES M. MEISTER, Primary Examiner

U.S. Cl. X.R.
83—410, 420